United States Patent Office 2,825,703
Patented Mar. 4, 1958

2,825,703

TUNGSTEN ARC ELECTRODE

Louis A. Conant, Indianapolis, Ind., assignor to Union Carbide Corporation, a corporation of New York No Drawing. Application December 6, 1955
Serial No. 551,461

2 Claims. (Cl. 252—515)

This invention relates to inert gas-shielded arc working such as cutting and welding, and more particularly to refractory or non-consumable metal electrodes for such use.

The present application is a continuation-in-part of my application Serial No. 320,358, filed November 13, 1952, for "Inert Gas-Shielded Arc Welding," now Patent No. 2,744,183, granted May 1, 1956.

In the past tungsten electrodes have contained a small amount (1%–2%) of thorium as an additive to improve such welding characteristics as contamination losses, open circuit starting voltage, and arc starting losses over commercially pure tungsten electrodes. However, the latter give superior welding performance with respect to operating voltage, melted base area, and weld nugget shape compared to thoriated tungsten electrodes.

The main advantages obtained by adding small amounts of thorium oxide to tungsten are (1) increased resistance of the electrode to contamination by the molten metal being welded, (2) more stable arc operation at relatively low (welding) current, (3) easier arc starting at relatively low voltage, (4) electrode operation at lower temperature, and (5) less work contamination by small particles of the electrode. The major advantage is claimed to be an increase in electrode life by a factor of approximately 10, and is believed to result chiefly from the increased resistance to contamination by molten metal. A disadvantage may lie in the health hazard accompanying the presence of thorium or its oxide in the welding zone.

The main object of this invention is to provide an inert gas-shielded arc welding electrode composed mainly of tungsten and containing a relatively small amount (0.02%–10%) of several additives which in combination result in unexpectedly superior welding characteristics compared to any single additive including thorium oxide known to the prior art.

According to this invention there also is provided an improved inert gas-shielded arc-working electrode which is composed predominantly of tungsten that contains dispersed therein finely divided ceria in an amount by weight of less than 3% and perferably about 0.10–0.30%, which can be fabricated by hot swaging without undesirable brittleness, and which results in a structurally strong electrode and produces unexpectedly stable operation and other advantages over the prior art.

Such additives are calcium oxide, yttrium earth concentrate (chiefly yttrium oxide), cerium oxide, and barium oxide. They are added to the tungsten powder in the course of manufacture of the electrodes to yield in the final product from 0.01% to 3% of each of the additives. The additives in the order of effectiveness in laboratory evaluation are calcium oxide, an yttrium earth concentrate (chiefly yttrium oxide), cerium oxide and barium oxide. These additives were introduced into experimental electrodes in concentrations of 2% by weight, with the exception of barium oxide where the concentration was 1%, the balance being tungsten.

The most significant laboratory tests are believed to be (1) extent of electrode contamination by contact with molten metal, (2) minimum open circuit voltage for reliable arc starting using high-frequency gap breakdown, (3) electrode weight loss during repeated arc initiation, (4) arc operating voltage, (5) base metal melting effectiveness, and (6) shape of the weld bead nugget.

Losses of electrode by low melting alloy formation following accidental contact with molten metal are likely to be one of the most important factors in determining electrode life, particularly in hand welding applications. For this reason, measurements were made to determine the ability of various electrodes to withstand contamination by molten stainless steel. A 200 ampere arc was maintained on a stainless steel anode for two minutes; the electrode was then forced into the molten pool of the anode four times in succession (the arc reestablishing itself between immersions) and finally operated for another two-minute period to allow impurities in the electrode to "burn-off." During the entire process the argon flow rate was 25 C. F. H.

The open circuit starting voltage characterizing an electrode under given starting conditions is an important quantity as it determines the open circuit requirement on the welding generator. Electrodes which exhibit a low open circuit voltage requirement for starting will permit a stable arc to be established almost instantaneously, thus minimizing labor and material expenses particularly in machine welding.

Electrode weight loss during starting with high-frequency voltage is significant in connection with spot welding and with repetitive machine welding of small parts or short lengths of seam. Starting loss characteristics were established by determining the weight change produced by many successive arc strikings.

The operating voltage is of interest because it is a measure of power input to the arc. Since most welding comparisons are made on an equal current basis and since in gas-arc welding the ratio of power transfer to the work to power input is nearly constant for a wide variety of conditions, the arc voltage is essentially a direct measure of the energy transferred to the work. Accordingly, for many applications a high arc voltage is desirable. On the other hand in welding thin materials burnthrough and other undesirable heating effects are to be avoided. One method of doing this is to decrease the arc power by decreasing the arc voltage. Several of the additives of the invention tested produce appreciable lowering of the arc voltage.

Another method of reducing arc power is by reducing the arc current. The extent to which this can be done is determined by the lower current limit for stable operation. This in turn is a function of electrode composition. It has been shown that stable operation can be realized at lower current than that found for standard tungsten rods by using thoriated electrodes. Such a determination has not been made for the electrodes of the invention. However, since it is believed that the starting voltage requirement is an indication of the lower current limit for stable operation, those electrodes having low starting voltage requirement are expected to operate stably at low arc currents. These are the same electrodes that produce appreciable lowering of the arc voltage so that barium oxide, cerium oxide, and yttrium oxide may be doubly advantageous when used as electrode additive for welding thin materials.

Contrary to results predicted by initial screening tests, all of the experimental electrodes containing additives operated at the normal pure tungsten electrode voltage or less. Weld beads were made to compare the influence of electrode composition on penetration and the amount of work metal melted. These welds were made at a welding speed of 40 I. P. M. on 0.055 inch thick stainless steel with 150 ampere DCSP arcs. The cold arc length was 0.050 inch and the argon flow rate 20 C. F. H.

The relative position of commercially available pure tungsten and 1% thoria-99% tungsten electrodes in such laboratory tests is compared below with that of experimental electrodes containing the additives of the invention. The most desirable performance is indicated by the first tabulated column with performance deteriorating to the position tabulated in the 6th column.

|  | 1 | 2 | 3 | 4 | 5 | 6 |
|---|---|---|---|---|---|---|
| Contamination Losses | BaO | $Y_2O_3$ | CaO | $ThO_2$ | $CeO_2$ | W |
| Open Circuit Starting Voltage | $Y_2O_3$ | $CeO_2$ | CaO | $ThO_2$ | BaO | W |
| Arc Starting Losses | $Y_2O_3$ | $CeO_2$ | $ThO_2$CaO |  | BaO | W |
| Operating Voltage | W | CaO | $ThO_2Y_2O_3$ |  | $CeO_2$ | BaO |
| Melted Base Metal Area | CaO | W | $ThO_2Y_2O_3$ |  | $CeO_2$ | BaO |
| Weld Nugget Shape | CaO | W | $ThO_2Y_2O_3$ |  | $CeO_2$ | BaO |

Inert gas-shielded arc welding electrodes of tungsten which contain a combination of at least two or more of such four additives, with or without a small amount (0.01%–2%) of thorium oxide, provide unexpectedly superior performance in such welding over any known to the prior art involving but one additive.

My U. S. application Serial No. 318,750, filed November 4, 1952, for "Inert Gas-Shielded Arc Welding," now Patent No. 2,695,946, claims the use of calcium oxide as the additive for refractory metal electrodes for gas-shielded arc welding; and my application Serial No. 318,749, filed November 4, 1952, for "Refractory Metal Electrode Inert Gas-Shielded Arc Welding," now Patent No. 2,695,945, claims the use of yttrium oxide for such purpose. Such patents disclose how the additives of the present invention may be incorporated with the refractory metal in making the new electrodes, and how such electrodes can be tested.

I have found that it is very desirable to disperse the selected additive material, especially ceria, throughout the tungsten of the electrode, because otherwise the effectiveness of the additive is lost relatively soon, especially during use, and other benefits are obtained from such dispersed additive. However, it is practically impossible to manufacture by swaging such electrodes containing more than a small amount of the additive because the material becomes too brittle.

Tungsten electrodes of the invention with dispersed ceria, contrary to the prior art, are actually physically benefited by such additive in that the electrode losses through contact with molten metal are very low. The test procedure for measuring the loss was to establish an argon shielded direct current-straight polarity arc of about 200 amperes between a 3/32" diameter test electrode and a stainless steel workpiece. The arc was maintained for about 2 minutes after which the electrode was plunged into the molten puddle and withdrawn sufficiently so that a visible arc was reestablished. This immersion was repeated three times, total 4, and then the 200 ampere arc was reestablished for about 2 minutes to clean the electrode. The following data were obtained:

| Electrode | Loss, mg. | Cerium Oxide Content, percent |
|---|---|---|
| Commercial Tungsten | 460 |  |
| Thoriated Tungsten | 10 |  |
| Ceriated Tungsten Lot I | 9 | 0.20 |
| Ceriated Tungsten Lot II | 28 | 0.10 |
| Ceriated Tungsten | 10 | 0.19 |

The fabrication of these ceria-containing electrodes, according to the invention, involves blending the powdered materials, pressing them into a stick which is sintered by passing an electrical current through the stick in a hydrogen atmosphere after which the electrodes are formed by hot swaging.

Further investigation indicates that a swaged electrode consisting of tungsten containing 0.10%–0.30% by weight of ceria dispersed therein is highly satisfactory for inert gas-shielded arc working such as welding and cutting. The following table indicates how the performance of a typical ceriated tungsten electrode of the invention compares with electrodes of pure tungsten and 2% thoriated tungsten electrodes.

*Electrode performance comparison*

| Electrode | Arc Stability | | Capacity | | Starting | | Contamination | | Performance Rating |
|---|---|---|---|---|---|---|---|---|---|
|  | AC | DCSP | AC | DCSP | AC | DCSP | AC | DCSP | |
| Pure Tungsten | 9 | 8 | 6 | 10 | 9 | 8 | 8 | 7 | 65 |
| 2% Thoriated Tungsten | 8 | ¹9 | 10 | 10 | 10 | 10 | 10 | 9 | 76 |
| 0.3% Ceriated Tungsten | 10 | ¹9 | 8 | 10 | 8 | 9 | 10 | 10 | 74 |

¹ Arc stability on direct current-straight polarity was checked over the full range for 3/32-in. electrodes (150–250 amperes). At the lower currents, the 0.3% ceria electrode was slightly more stable than the 2% thoriated. But this performance was reversed at the top of the current range.

I claim:

1. A non-consumable inert gas-shielded arc electrode that is composed of swaged tungsten having dispersed therein finely divided ceria in an amount by weight of 0.01% to 0.30% thereof.

2. A swaged electrode consisting of tungsten containing 0.10% to 0.30% by weight of ceria dispersed therein.

References Cited in the file of this patent

UNITED STATES PATENTS 2,744,183   Conant _____ May 1, 1956